April 19, 1938. T. J. REES 2,114,969
PRIME MOVER
Filed March 13, 1935 6 Sheets-Sheet 1
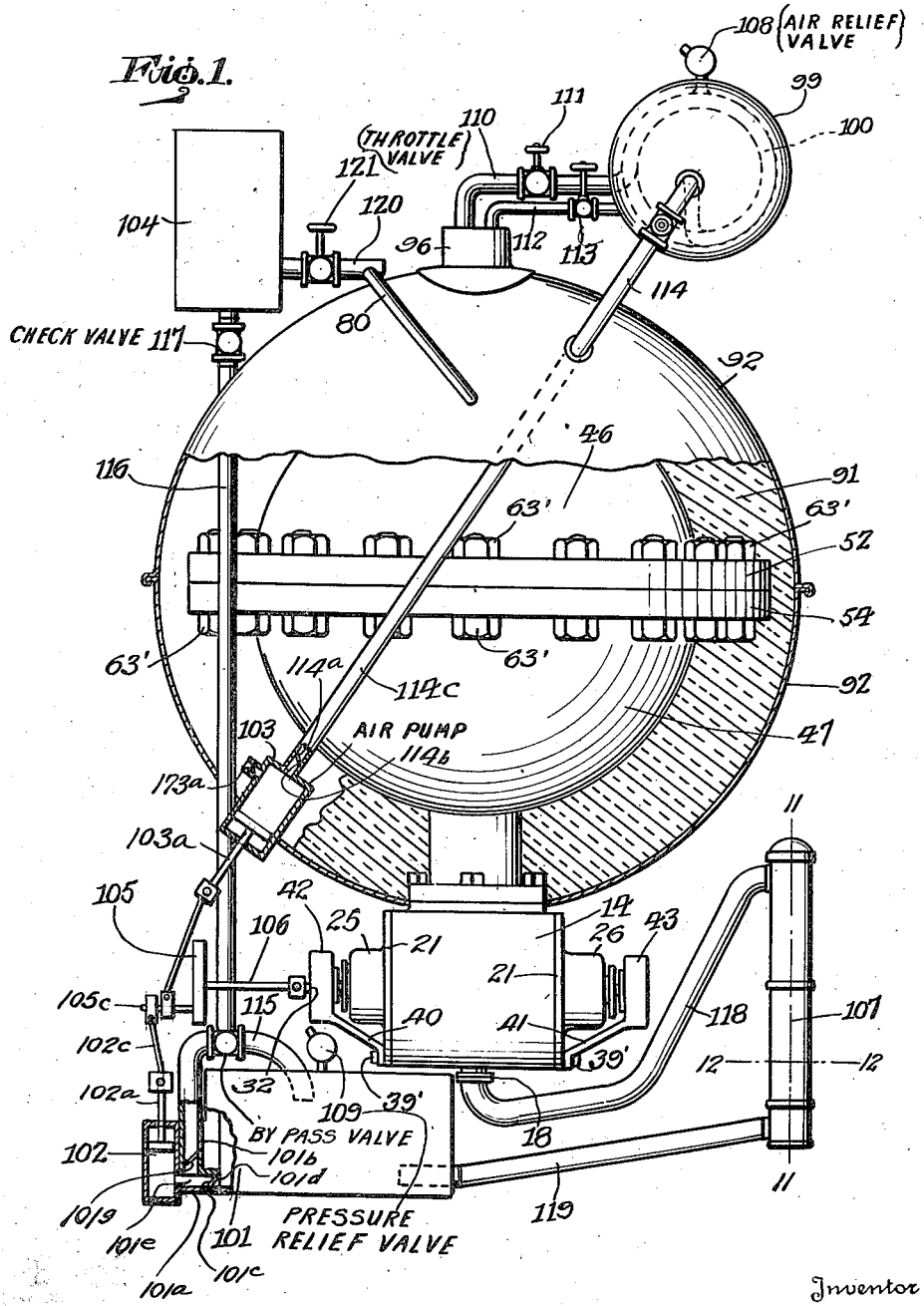
Inventor
Thomas J. Rees
By Geo. P. Kimmel
Attorney

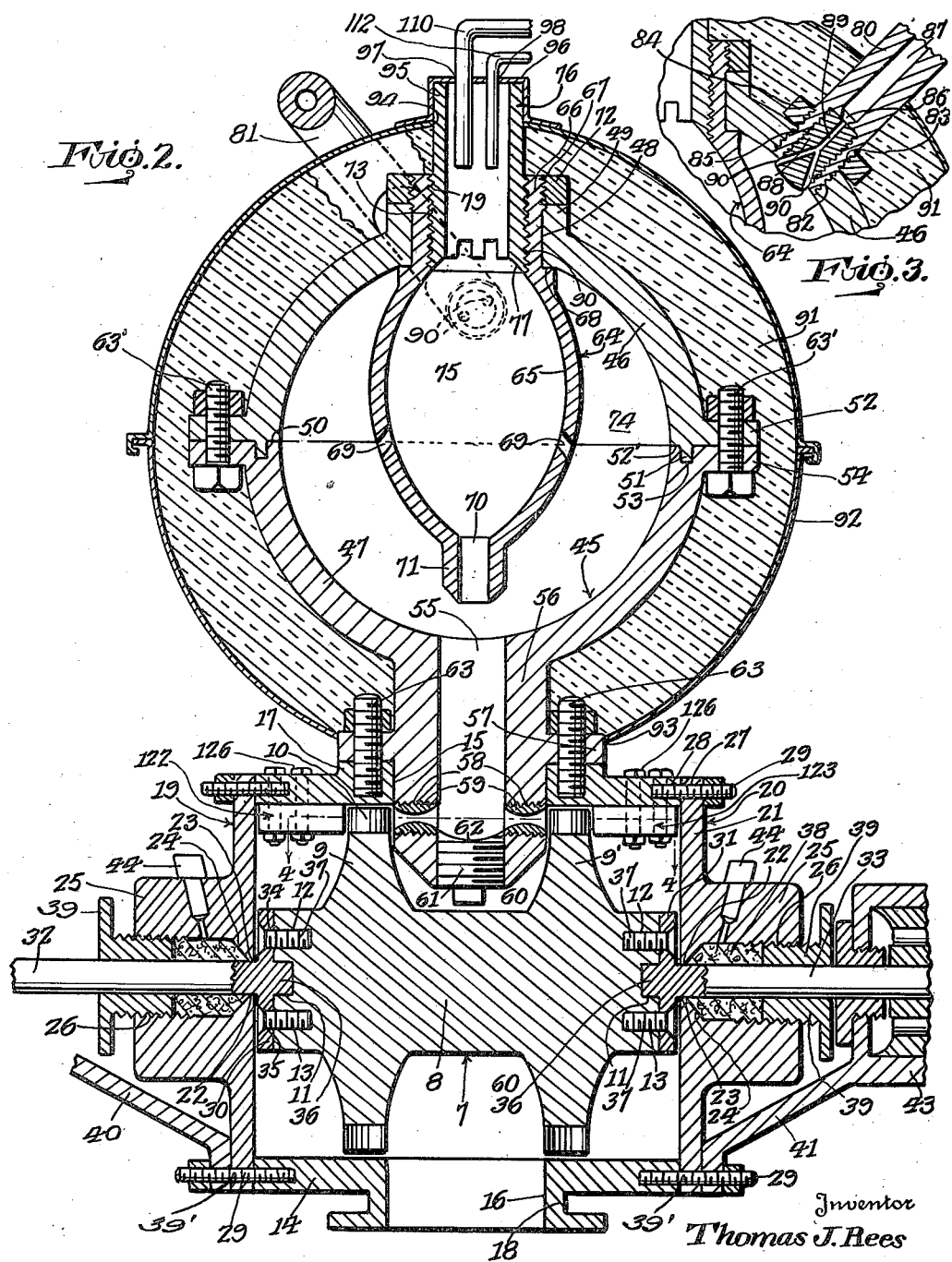

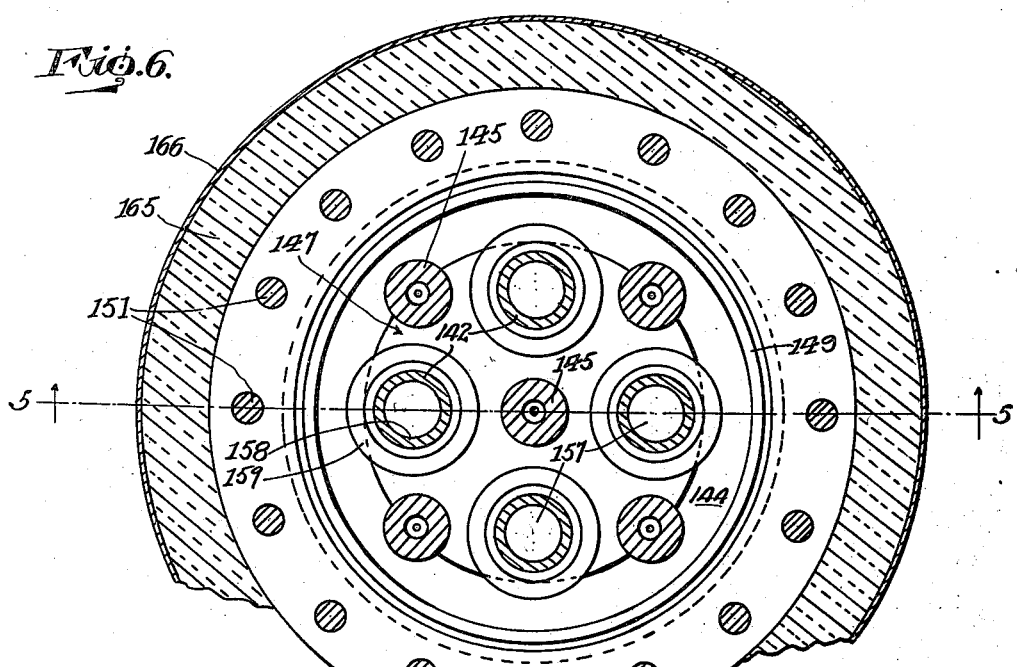
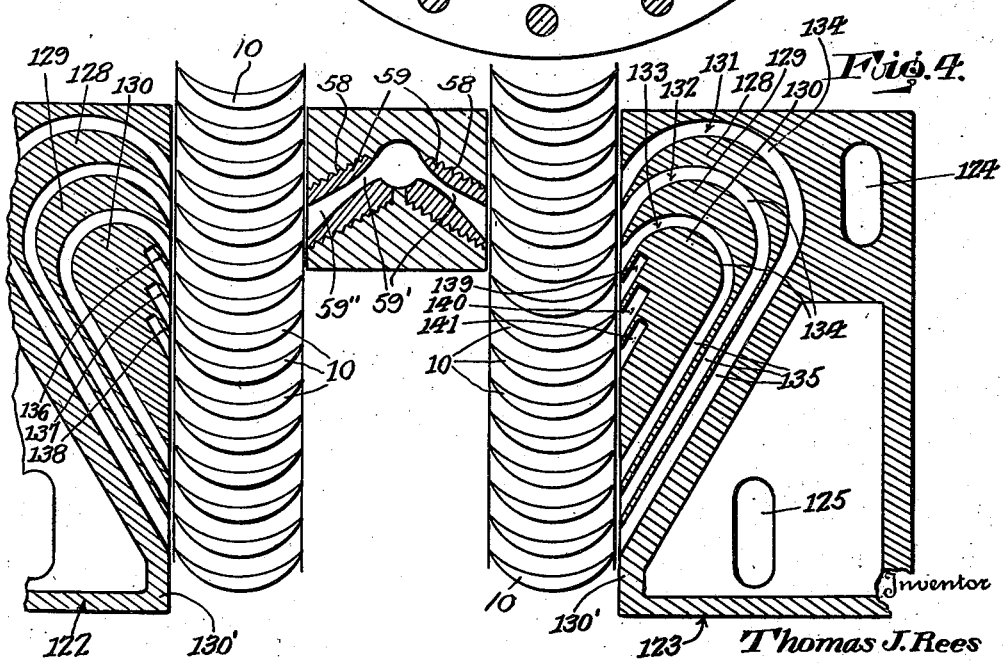

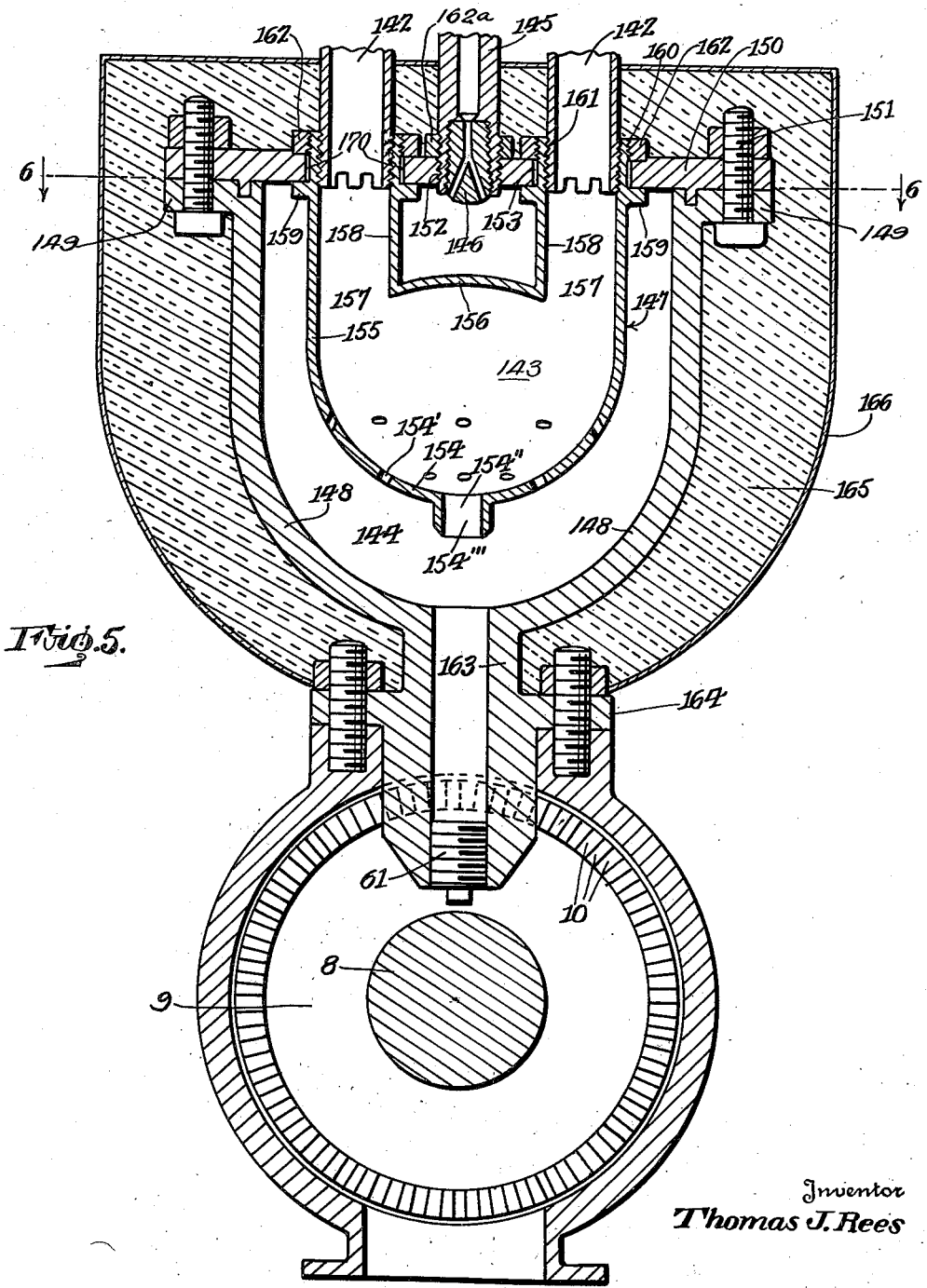

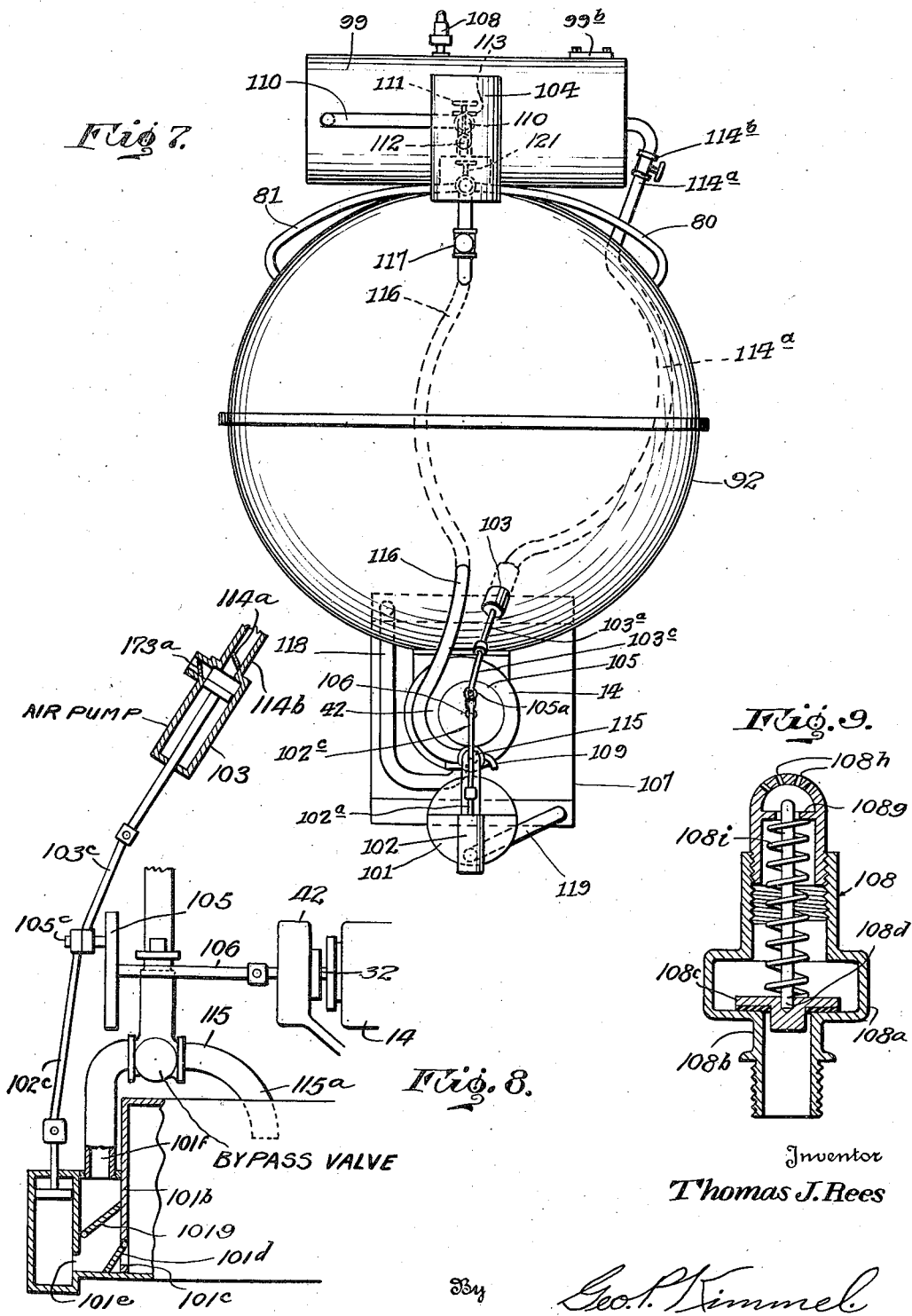

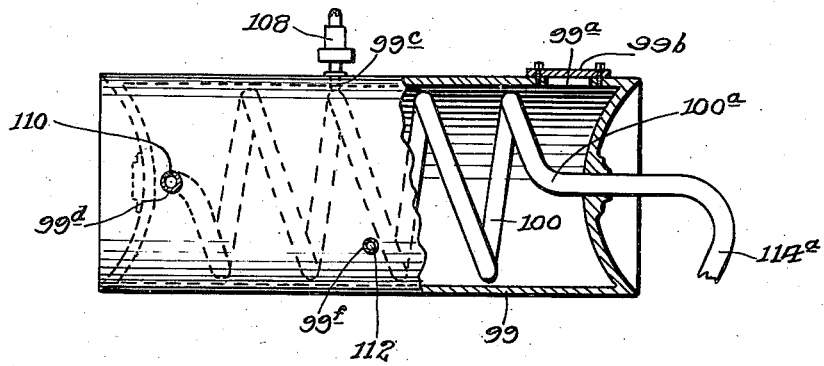
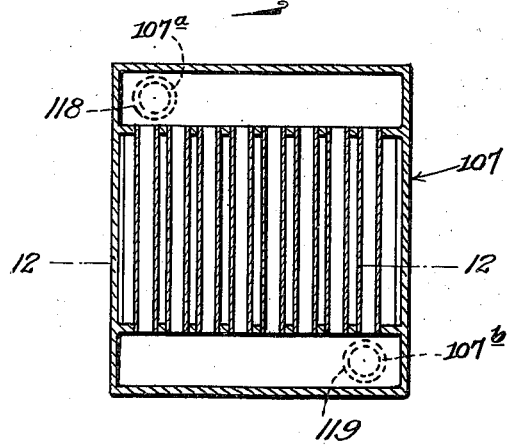
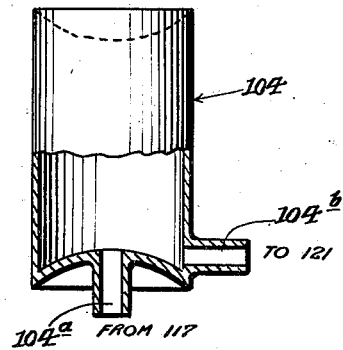
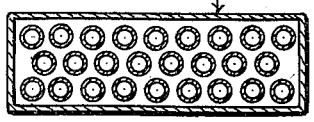

Patented Apr. 19, 1938

2,114,969

UNITED STATES PATENT OFFICE 2,114,969

PRIME MOVER

Thomas J. Rees, Reno, Nev.

Application March 13, 1935, Serial No. 10,923

1 Claim. (Cl. 60—42)

This invention relates to a prime mover, such as an internal combustion super-heated steam engine of the rotary or reciprocatory type and has for its object to provide in a manner as hereinafter set forth, an engine of the class referred to whereby the products of combustion are mixed with super-heated water vapor at a determined pressure and high temperature and whereby an energy medium in its superlative quality is utilized to operate the rotor of the engine.

A further object of the invention is to provide, in a manner as hereinafter set forth, an engine of the class referred to, of less weight, occupying less space per horse power and possessing higher thermal efficiency than the types of heat engines now generally used, and having a compactness of form making it especially adaptable for aeroplanes.

A further object of the invention is to provide, in a manner as hereinafter set forth, an engine of the class referred to including a combustion chamber encompassed by and communicating with an expansion chamber supplied with a vaporized medium having its temperature increased from the heat transferred through the wall of the combustion chamber and by the products of combustion to result in a super-heated driving medium, under pressure, which is instantly released while in its superlative quality to the rotor of the engine to perform work.

A further object of this invention is to provide, in a manner as hereinafter set forth, an engine of the class referred to including means to burn a fuel such as butane ($C_4H_{10}$) or kindred gases at constant pressure, and a combustion chamber built to a dimension, whereby the gases at combustion temperature, will be of a volume corresponding with the volume of the combustion chamber at the determined operating pressure.

A further object of the invention is to provide, in a manner as hereinafter set forth, an engine of the class referred to having a combustion chamber surrounded by an expansion chamber for the reception of water injected therein under pump pressure through a vaporizer to contact the furnace wall of high temperature to form a super-heated vapor of equal pressure and greater volume than and to admix with the products of combustion, thereby generating an energy medium of known quality, eliminating the heat losses of the vent or chimney, diminishing the high heat losses of combustion chamber walls and thereby increasing the thermal efficiency of the engine.

To the above ends essentially and to others which may hereinafter appear, the invention consists of such parts and such combination of parts which fall within the scope of the invention as claimed.

In the drawings:

Figure 1 is a front elevation, partly broken away, of the engine,

Figure 2 is a vertical sectional view of the engine,

Figure 3 is a fragmentary view in section, showing the form of vaporizing element used, Figure 4 is a fragmentary sectional plan on line 4—4, Figure 2, Figure 5 is a fragmentary view in vertical section of a modified form, Figure 6 is a section on line 6—6, Figure 5, Figure 7 is an end elevation of the structure shown in Figure 1, Figure 8 is a fragmentary vertical section illustrating the water pump, air pump, operating means common to said pumps, a reservoir, a part of the water supply line, a part of the air supply line, the bypass between the water supply line and the reservoir and the bypass valve, and a part of the power transmitting means;

Figure 9 is a vertical sectional view of the air relief valve for the air supply line;

Figure 10 is a side elevation partly broken away showing the fuel tank or fuel reservoir;

Figure 11 is a section on the line 11—11 in Figure 1;

Figure 12 is a section on the line 12—12 in Figures 1 and 11; and

Figure 13 is a side elevation partly in section showing a standard water pressure tank.

With reference to Figures 1 to 4. The engine, as shown, includes a rotor 7 formed of a hub 8 provided with a pair of annular flanges 9, 9'. Each flange is located between the transverse center and one end of hub 8. Each flange, at its outer edge, is formed throughout and circumferentially thereof with a series of segment shaped, spaced vanes 10 of like form and of a length corresponding to the width of said edge. Each end of hub 8 is formed with an axially arranged socket 11 and a pair of diametrically opposed sockets 12, 13 spaced from socket 11. The walls of sockets 12, 13 are threaded. The purpose of the aforesaid sockets will be hereinafter set forth. The casing or housing of rotor 7 is stationary and it consists of a horizontally disposed cylinder 14 open at each end. The cylinder 14, centrally of its top, is formed with an enlarged opening 15 and centrally of its bottom with an enlarged opening 16 aligning with opening 15.

Integral with the outer face of cylinder 14 and surrounding opening 16 is an annular flanged collar 18. The rotor casing or housing includes a pair of oppositely disposed heads 19, 20 of like form. Each head includes a circular disc 21 corresponding in diameter to the outer diameter of cylinder 14. The discs 21 abut the end edges of cylinder 14 and are flush with the outer face of the latter. Each disc is formed with an axial opening 22. The wall of opening 22 has its inner part 23 of uniform diameter and its remaining part 24 increasing in diameter from the part 22 to the outer end thereof. Each disc has its outer face formed with an annular boss or packing gland 25 which, at its inner end, surrounds and has its inner face flush with the outer end of the wall of opening 22. The inner face of boss 25 is threaded, as at 26. The discs 21 are formed with openings 27 adjacent their outer edges for registering with screw threaded sockets 28 formed in the end edges of cylinder 14. Extending through openings 27 and engaging in sockets 28 are the holdfast means 29 for clamping the heads 19, 20 to the cylinder ends.

Positioned against the ends of the hub 8 are a pair of oppositely disposed heads 30, 31 for a pair of oppositely extending power transmitting shafts 32, 33 respectively, which also provide the supporting axes of the rotor 7. The heads 30, 31 are integral at the axes of their outer faces with the inner ends of the shafts 32, 33 respectively. The heads 30, 31 are provided with countersunk openings 34, 35 which register with the sockets 12, 13 respectively. The heads 30, 31 have, axially of their inner faces, lugs 36 which are positioned in the sockets 11. Extending through the openings 34, 35 and engaging with the walls of sockets 12, 13 are holdfast means 37 for anchoring heads 30, 31 to hub 8.

Arranged within the bosses 25 are packings 38. Extending into and threadedly engaging with bosses 25 are flanged compressing and retaining nuts 39 for the packings.

Detachably connected to the heads 19, 20, as at 39', and extending laterally therefrom are upwardly inclined supporting arms 40, 41 carrying bearing structures 42, 43 for the shafts 32, 33 respectively. The bosses 25 are provided with lubricant supply means, as at 44. The heads 19, 20 are spaced from the heads 30, 31 respectively.

The engine includes a housing 45 of spherical contour formed of upper and lower semi-spherical sections 46, 47 respectively, disposed in superimposed relation. The section 46, centrally of its top, is formed with a large opening 48 surrounded by an annular boss 49. The section 46 has its bottom edge 50 formed centrally thereof with an annular bead 51. The section 46, at its bottom, is provided with an outwardly directed annular flange 52 flush at its lower face with edge 50. The section 47 has its top edge 52' provided with an annular groove 53 in which is seated bead 51. The section 47, at its top, is formed with an outwardly directed annular flange 54 having its upper face flush with edge 52'. The section 47 is provided, centrally of its bottom, with an opening 55 of less diameter than that of opening 48. The section 47 includes, at its bottom, a depending tubular extension 56 having its inner face registering with the wall of opening 55. The extension 56 has intermediate its ends a peripheral annular flange 57 which seats on the boss 17. The extension 56, between flange 57 and its lower end, is formed with a pair of spaced aligning openings 58 extending at opposite inclinations. Anchored in each of the openings 58 is a nozzle 59. Each nozzle has its inner face gradually decreasing in diameter from its intake end to a point inwardly adjacent its transverse median, as at 59', and then gradually increasing in diameter from such point to its outlet end, as at 59''. The part 59'' is of greater length and diameter than part 59' (Figure 4). The extension 56 projects into the opening 60 between the flanges 9, 9' of the rotor. Each nozzle 59 is positioned to discharge between the inner ends of the vanes 10 carried by a flange 9 or 9'. The lower end of extension 56 is closed by a plug 61 having its upper end of concave curvature, as at 62. The curved end of plug 61 is flush with the inner end of the lower part of the inner faces of the nozzles. The flange 57 is anchored to the boss 17 by the holdfast means 63. The sections 46, 47 of housing 45 are secured together by the holdfast means 63' coacting with the flanges 52, 54. These latter are apertured for the passage of the said means 63'.

Suspended within and spaced throughout from the inner face of the housing 45 is a casting 64. The casting 64 is suspended at its upper end from the upper section 46 of the housing 45. The casting 64 is formed of an open top hollow body part 65 of frusto-elliptical contour in vertical section, terminating at its upper end in a vertical neck 66 formed on the upper portion of its outer periphery with threads 67. At the point of joinder of the lower end of neck 6 with body part 65, the casting 64 is formed with an annular shoulder 68. The body part 65 is provided with spaced outwardly directed downwardly inclined ports 69. The lower end of body part 65 is formed centrally thereof with an opening 70 and a depending short tubular outlet nipple 71 having its inner face flush with the wall of opening 70. The nipple 71 is spaced above opening 55, aligns with the latter and has its inner diameter less than the inner diameter of extension 56. The neck 66 extends upwardly through opening 48 to above the boss 49. The casting 64 is suspended within housing 45 by an interiorly threaded collar 72 in connection with shoulder 68. Collar 72 engages the threaded portion 67 of neck 66 and, when screwed home, it abuts boss 49 and causes shoulder 68 to abut the inner face of section 46 of housing 45. The inner face of neck 66 is threaded throughout, as at 73, for a purpose to be referred to.

The housing 45, in connection with the body part 65 of casting 64, provides an expansion chamber 74 having its outlet provided by the extension 56. The body part 65 of casting 64 provides a combustion chamber 75 communicating with the expansion chamber 74 by means of the ports 69 and nipple 71. The outlet of chamber 75 is provided by nipple 71.

Positioned within, secured to and extending outwardly from neck 66 is a tubular burner 76 having its lower end 77 curved, flush with and forming a continuation of the inner face of body part 65 of casting 64. The lower portion of the outer periphery of burner 76 is formed with threads 79 for engagement with the threads 73 of neck 66.

Disposed at opposite inclinations with respect to the axis of and extending into housing 45 at the upper portion thereof, is a pair of water supply elements 80, 81 having their inner ends positioned in close proximity to the upper part of opposite sides of the body part 65 of casting 64. The elements 80, 81 open into the upper portion of chamber 74. The housing section 46 is formed with a pair of screw threaded openings 82, only one shown. These openings are located adjacent opposite sides of the boss 49. Each water supply element is formed at the inner portion of its outer periphery with threads 83 (Figure 3) for engagement with the threads of a wall of an opening 82. A lock nut 84 is carried by each water supply element and abuts the outer face of housing section 46. Each water supply element is formed with an internal socket 85 opening at its inner end, a flared port 86 opening into the socket 85 at the base of the latter, and a water conducting channel 87 leading from its outer end to and merging into the large end of the port 86. The wall of socket 85 is threaded. Mounted in the socket 85 and projecting from the inner end of the element is a vaporizing member 88 formed axially thereof with a port 89 which registers at its outer end with the smaller end of port 86 and merges at its inner end into a plurality of oppositely inclined ports 90 discharging into chamber 74. The periphery of member 88 is threaded for engagement with the threaded wall of socket 85.

Encompassing that portion of extension 56 above flange 57, the housing sections 46, 47, flanges 52, 54, holdfast means 63', boss 49, collar 67 and a portion of burner 76 is an insulating body 91 of greater thickness than housings sections 46, 47. Encasing the body 91 is a sectional metallic spherical shell 92 having openings 93, 94 respectively for the extension therethrough of a part of flange 57 and the projection therefrom of the upper portion 95 of the burner 76. Mounted on the latter and secured to shell 92 is a flanged cap member 96 formed with a pair of openings 97, 98 for a purpose to be referred to.

The engine includes a fuel tank 99 arranged above the shell 92. The tank is of any well-known construction as shown in Figure 10 including a hand hole opening 99a with a removable cover plate 99b. An opening 99c in the top of the tank allows the connection between the air relief valve 108 and the pipe coil 100 which is inside of the tank 99. An opening 99f in the tank connects the fuel supply in the tank with the fuel supply pipe 112. An opening 99d at the side of the tank allows the end of the coil 100 to extend therethrough and to be connected to the air supply pipe 110. Within the tank 99 is positioned the coiled air pipe 100 which has connected therewith, intermediate its ends, an air relief valve 108 connected through the opening 99c. The air relief valve 108 is of any well-known construction. It may be of a construction as indicated in Figure 9. This relief valve includes a casing 108a which communicates with the inlet pipe 108b. For closing the opening in the inlet pipe, there is provided an ordinary disk valve 108c. The valve is provided with a stem 108d about which is placed a spring 108i which abuts against a wall 108g at one end and against the valve 108c at the other end. This spring normally holds the valve on its seat. When pressure exceeds a definite amount, the spring is compressed and the valve is lifted from its seat allowing the fluid pressure to be relieved by way of the openings 108h.

The engine includes a water reservoir 101 which is arranged below the power transforming means 14. At the end of the water reservoir is a water pump 102 interconnected at the point 101a by means of the opening 101c which is controlled by an ordinary flap type check valve 101d. An opening 101e places the pump in communication with the inlet 101c. The outlet 101b of the pump is also controlled by flap type check valve 101g. This is indicated as a simple type of force pump, it being understood that any appropriate and suitable pump may be utilized.

The reservoir is also arranged with a pressure relief valve 109 connected thereto so as to always provide a means for relieving any excess pressure in this tank.

The engine also includes the air pump 103 indicated as a simple reciprocating pump having its outlet to the pipe 114 controlled by means of a flap type check valve 114a pivoted at 114b and having a similar type air inlet valve at 173a. The pump 103 forces air into the lower end of the air line 114 which connects with the coil 100 in the fuel tank. The air line 114, intermediate its ends as at 114c, extends through the insulating body 91 as indicated in Figures 1 and 7.

The water pressure tank 104 is of any standard construction, one typical arrangement being indicated in Figure 13, wherein it has an intake opening 104a at the bottom and an outlet 104b at the side. The intake 104a is at the upper end of the water supply line 116, the check valve 117 being intermediate the water supply pipe 116 and the tank 104. The outlet 104b communicates with the water pipe 120 by means of the throttle valve 121. At the lower end of the water supply pipe 116 is positioned a valve controlled bypass 115 as indicated in Figure 1. The disk 105 is driven by the drive shaft 106 and in turn imparts a reciprocating motion to the piston rods 103a and 102a of the air pump and water pump respectively. These piston rods are connected to the rotatable disk 105 by the eccentric pin 105c to which is pivotally connected the crank arms 103c and 102c. These crank arms are respectively connected to the piston rods by the interconnecting couplings 103b and 102b.

The disk 105 is operated from the drive connection 106 coupled to the shaft 32. A condenser 107 is arranged to receive the exhaust by way of pipe 118 from the power transforming means 14 and to condense the water vapor returning it to the water tank 101 by way of the pipe 119. Leading from the coil 100 in the tank 99 and extending through the opening 97 and discharging into the burner 76 is the air supply line 110 provided with an air throttle valve 111. Also leading from the tank 99 and extending through an opening 98 and discharging into the burner 76 is a fuel supply line 112 provided with a throttle valve 113. The water line 116 is also embedded for a portion of its extent as at 116a in the insulating body 91. Coupled to the flange collar 18 and extending to the upper end of the condenser 107 is the exhaust line 118. Leading from the bottom of the condenser 107 to the reservoir 101 is the water return line 119. Leading from the tank 104 to the elements 80 and 81 is the water feed line 120 provided with a throttle valve 121.

Associated with each set of vanes 10 is a set of stationary re-entry vanes and a set of stationary blind end vanes. The re-entry and blind end vanes which associate with one set of vanes 10 are formed in a single block and those which associate with the other set of vanes 10 are also arranged in a single block. The blocks are of arcuate form and designated 122, 123. The blocks are positioned within the upper portion of cylinder 14 and, when positioned, the vanes in one block are oppositely disposed with respect to the vanes in the other block. The blocks are arranged against the inner face of the top of cylinder 14 in a sidewise opposed parallel spaced relation. Each block is formed with a pair of non-aligning slots 124, 125 disposed lengthwise thereof. The inner side of each block is to oppose the outer end of a set of vanes 10. Holdfast means 126 coact with the slots 124, 125 for adjustably connecting the blocks to cylinder 14, whereby the blocks may be adjusted to suit operating temperature. The vanes of each stationary set of re-entry vanes are designated 128, 129 and 130 and have their ends flush with the inner side edge 130' of a block. The block is formed with channels 131, 132, 133, each consisting of a curved stretch 134 and an inclined stretch 135. The outer end of stretch 134 is at the edge 130'. The inner end of stretch 134 merges into the inner end of stretch 135. The outer end of stretch 135 is at the edge 130'. The stretch 135 is of greater length than stretch 134. The channels progressively decrease in length from channel 131 to channel 133. The channel 131 is arranged between vane 128 and the body of the block. Channel 132 is arranged between vanes 128 and 129. Channel 133 is arranged between vanes 129 and 130. The stretches 135 of the channels are arranged parallel to each other. The vanes of each stationary set of blind end vanes are indicated at 136, 137 and 138, and are formed in vane 130. Between the vanes 136, 137 and 138 are arranged the inclined parallel pockets 139, 140 and 141 respectively, opening at edge 130'.

The stationary vanes are so constructed that very small expansion of the steam takes place within them, the steam re-entering the moving vanes 10 with the same velocity it attained when entering the stationary vanes. Thus the energy available in the vapor is obtained in the speed of the wheel.

The operating temperature having been determined, the velocity of the super-heated vapor computed, the speed of the vanes 10 with a single re-entry should be about one-fourth the velocity of the vapor. When the wheel speed increases beyond one-fourth the vapor's velocity, the vanes 10 are carried beyond the re-entry vane so that the vapor would contact the blind end vanes, the resistance thus offered the vapor would reduce the wheel speed to normal. The blind end vanes simplify speed control.

The ports 69 in the combustion chamber wall are to allow the high temperature products of combustion to gradually increase the temperature of the vapor so that the mixing of the gases will be complete when the medium enters the expanding nozzles 59.

The nozzles 59 are constructed of a chrome nickel alloy and installed on opposite sides of extension 56, releasing the superheated vapor to the vanes 10 of the rotor simultaneously, thereby eliminating side-thrust.

The vaporizers are installed at the furthest suitable point from the discharge opening so that the injected medium may contact the outer peripheral surface of the wall of the combustion chamber 75.

Into the expansion or steam chamber water is injected through the vaporizers under a pressure similar to the fuel pressure. The quantity of water injected depending on the determined operating temperature, the pressure and volume of the super-heated vapor coordinated by the cubical dimension of the expansion or steam chamber. The expansion chamber is built to a cubical dimension corresponding to the volume of the combustion chamber plus the volume of the super-heated vapor plus the volume of the products of combustion at the operating steam temperature.

Fuel and air under pressure is injected into the combustion chamber. The air is compressed by the pressure pump 103 and conveyed by the line 114 to a pipe coil 100 installed within the fuel tank 99. The pressure within the coil is regulated by the valve 108. The air is admitted to the burner 76 on opening the throttle valve 111. The fuel is released by the throttle valve 113 and conveyed to the burner by the line 114. Combustion takes place in the chamber 75.

Water is introduced from the reservoir 101 by the pump 102 through the line 116 into the pressure tank 104. On opening the throttle valve 121 the water is distributed by the conducting elements 80, 81 to the vaporizers 88 and injected into the expansion chamber 74 as vapor to contact the hot gases of the combustion chamber 75, absorbing the products of combustion escaping through the ports 69. The energy medium is released through and expanded by the nozzles 58 to the vanes 10 and returned by the re-entry vanes to the vanes 10, conveyed by the exhaust pipe 118 to the condenser 107 and returned to the reservoir 101 to be used over again.

The valve controlled by-pass 115 installed in the water line 116 regulates the water feed when the thermal pressure exceeds the operating working pressure. The excess water is returned by the by-pass 115 to the reservoir 101.

With reference to Figures 5 and 6. They disclose a modified form of an internal combustion super-heated steam engine, in accordance with this invention. The modification relates to the employment of a series of burners 142, a combustion chamber 143 common thereto, an expansion chamber 144 encompassing the combustion chamber, a series of water conducting elements 145, each provided at its inner end with a vaporizer 146 discharging into the expansion chamber 144.

In Figure 5, the casting 147 which provides the combustion chamber 143 is of annular semi-oval contour in vertical section and open at its upper end. The housing 148 which coacts with the casting 147 to provide the expansion chamber 144 is formed of an open top laterally flanged annular section 149 of semi-oval contour in vertical section and a flat section 150 which interengages with section 149. Holdfast means 151 are employed for securing the housing sections together. The bottom of housing section 148 is constructed in the same manner as housing section 47 shown in Figure 2.

The burners 142 are of the same construction as the burner 76. The water conducting elements 145 are of the same construction as the elements 80, 81, but are vertically disposed. The vaporizers 146 are of the same construction as the form shown in Figure 3. Housing section 150 is formed with a series of spaced openings 152 having threaded walls and with a series of spaced openings 153 of greater diameter than the openings 152. These latter are arranged between and spaced from the openings 153.

The casting 147 is hollow and is formed of a concave bottom part 154, an annular side part 155 and a convex top part 156, which is supported below and spaced from the housing section 150 as at 170. The bottom part 154 is formed with a series of downwardly directed outwardly inclined ports 154', and axially thereof with an opening 154" having its walls registering with the inner face of a short depending nipple 154'''. The top part 156 is formed with a series of spaced openings 157 and a series of upstanding integral necks 158 having their inner faces flush with the edges of openings 157. The necks 158, in proximity to their upper ends, are formed with annular peripheral flanges 159. The necks 158 are formed with internal and external threads 160, 161 respectively. The necks 158 constitute intakes for the combustion chamber 143 provided by the casting 147. The necks 158 extend upwardly through the openings 153 and have connected to the external threads 161 thereof internally threaded collars 162 which coact with the flanges 159 for suspending casting 147 within housing 148 from housing section 150. The suspension arrangement provided for expansion of necks 158, by the gap 170, and for the spacing of the combustion chamber from housing 148. Extending into the upper ends of and secured to the inner faces of the necks 158 are the burners 142.

The water conducting elements 145 extend into the openings 152 and are anchored to the housing section 150 by lock nuts 162a. The housing 148, that portion of the depending extension 163 thereof above its flange 164, the inner portion of burners 142 and the inner portions of elements 145 are encompassed by a body 165 of insulating material. The body 165 is enclosed by a metallic shell 166 through the top of which project the burners 142 and element 145. Otherwise than that as stated, the modified form shown in Figures 5 and 6 will be constructed similar to the form shown in Figures 1 to 4.

Although the preferred construction is as illustrated and described, it is to be understood that changes, variations and modifications may be made therein which fall within the scope of the claim hereunto appended.

What I claim is:

In a prime mover, a housing forming an upstanding closed top expansion chamber in which is generated a superheated driving medium, a structure providing a combustion chamber including a series of spaced tubular parts passing upwardly through said top, means coacting with said parts and top for suspending said combustion chamber within and in spaced relation to the sides and bottom of the expansion chamber, a series of burners, each extending in and opening into the upper portion of a tubular part, said burners and parts having coacting means for securing them together, water vapor supply elements opening into the expansion chamber, anchored in the top of the latter and arranged between said burners, said structure being formed with spaced openings for establishing communication between the combustion chamber and the sides of the expansion chamber, said structure having means in its bottom for establishing communication between the lower portion of the combustion chamber and the lower portion of the expansion chamber, and said expansion chamber having an outlet in its bottom for conducting off the driving medium to a point of utilization.

THOMAS J. REES.